US011927897B2

(12) United States Patent
Teraji

(10) Patent No.: US 11,927,897 B2
(45) Date of Patent: Mar. 12, 2024

(54) POWDER CONVEYING DEVICE AND IMAGE FORMING APPARATUS INCORPORATING SAME

(71) Applicant: Hajime Teraji, Kanagawa (JP)

(72) Inventor: Hajime Teraji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/079,885

(22) Filed: Dec. 13, 2022

(65) Prior Publication Data

US 2023/0195009 A1 Jun. 22, 2023

(30) Foreign Application Priority Data

Dec. 21, 2021 (JP) ................................ 2021-206826

(51) Int. Cl.
*G03G 15/08* (2006.01)
*G03G 21/10* (2006.01)

(52) U.S. Cl.
CPC ....... *G03G 15/0891* (2013.01); *G03G 21/105* (2013.01); *G03G 2215/0802* (2013.01)

(58) Field of Classification Search
CPC ........... G03G 15/0879; G03G 15/0891; G03G 21/105; G03G 2215/0607; G03G 2215/0802
See application file for complete search history.

(56) References Cited

U.S. PATENT DOCUMENTS

2011/0081168 A1* 4/2011 Kimura .............. G03G 15/0872 399/258
2011/0097094 A1 4/2011 Hamano et al.
2015/0234341 A1 8/2015 Teraji et al.
2015/0331362 A1 11/2015 Azeyanagi et al.
2016/0306318 A1 10/2016 Tomita et al.
(Continued)

FOREIGN PATENT DOCUMENTS

EP 2 075 639 A2 7/2009
EP 2 395 399 A2 12/2011
EP 2 735 915 A2 5/2014
(Continued)

OTHER PUBLICATIONS

Extended European Search Report dated May 25, 2023, in corresponding European Patent Application No. 22212287.1, 9pp.

*Primary Examiner* — Sophia S Chen
(74) *Attorney, Agent, or Firm* — XSENSUS LLP

(57) ABSTRACT

A powder conveying device includes a first conveyor, a first conveyance passage, a fall passage, a second conveyor, and a second conveyance passage. The first conveyor conveys powder in a substantially horizontal direction and is disposed in the first conveyance passage. The powder output from an outlet port of the first conveyance passage is to fall in the fall passage. The second conveyor conveys the powder in the substantially horizontal direction and is disposed in the second conveyance passage that has an inlet port to receive the powder falling in the fall passage. When viewed in a cross section orthogonal to a powder conveyance direction, a cross-sectional area of a space that is not occupied by the first conveyor in the first conveyance passage is larger than a cross-sectional area of a space that is not occupied by the second conveyor in the second conveyance passage.

8 Claims, 6 Drawing Sheets

(56) References Cited

U.S. PATENT DOCUMENTS

2023/0085461 A1* 3/2023 Hashimoto .......... G03G 21/105
399/165

FOREIGN PATENT DOCUMENTS

JP 2011-090271 5/2011
JP 2012-103314 5/2012
WO 2017/073015 A1 5/2017

* cited by examiner

POWDER CONVEYING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2021-206826, filed on Dec. 21, 2021, in the Japan Patent Office, the entire disclosure of which is hereby incorporated by reference herein.

BACKGROUND

Technical Field

Embodiments of the present disclosure relate to a powder conveying device that conveys powder such as toner, and an image forming apparatus incorporating the powder conveying device.

Related Art

Image forming apparatuses, such as copiers, printers, facsimile machines, and multifunction peripherals (MFPs) including at least two functions of a copier, a printer, and a facsimile machine, are known that include a plurality of conveyance passages as a powder conveying device to convey powder such as toner.

On the other hand, a technology is described in a conveying device including a first conveyance passage in which waste toner is conveyed in a horizontal direction by a first conveyor and a second conveyance passage in which waste toner discharged from the first conveyance passage and falling due to its own weight is conveyed obliquely downward by a second conveyor. In the technology, the amount of waste toner conveyed by the first conveyor is larger than the amount of waste toner conveyed by the second conveyor.

SUMMARY

In an embodiment of the present disclosure, there is provided a powder conveying device that includes a first conveyor, a first conveyance passage, a fall passage, a second conveyor, and a second conveyance passage. The first conveyor conveys powder in a substantially horizontal direction and is disposed in the first conveyance passage. The powder output from an outlet port of the first conveyance passage is to fall in the frill passage. The second conveyor conveys the powder in the substantially horizontal direction and is disposed in the second conveyance passage. The second conveyance passage has an inlet port to receive the powder falling in the fall passage. When viewed in a cross section orthogonal to a conveyance direction in which the powder is conveyed, a cross-sectional area of a space that is not occupied by the first conveyor in the first conveyance passage is larger than a cross-sectional area of a space that is not occupied by the second conveyor in the second conveyance passage.

In another embodiment of the present disclosure, there is provided an image forming apparatus that includes the powder conveying device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
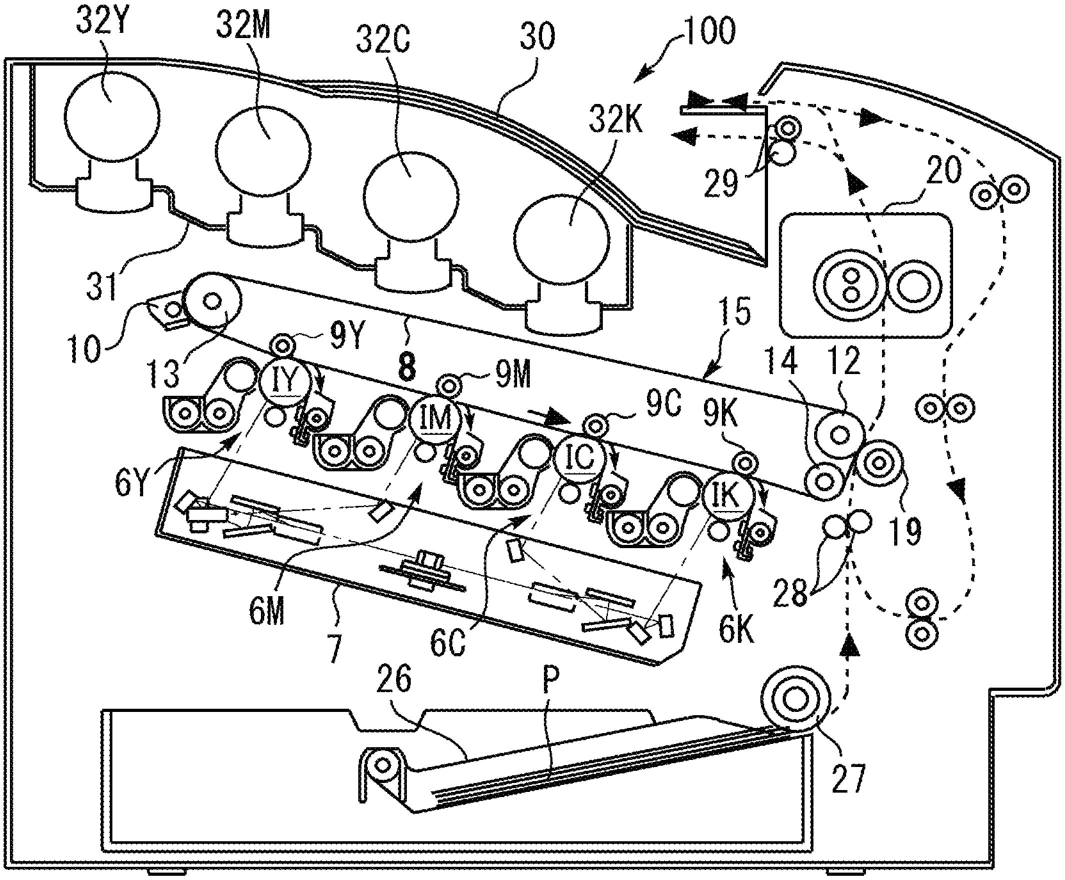
FIG. 1 is a diagram illustrating an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
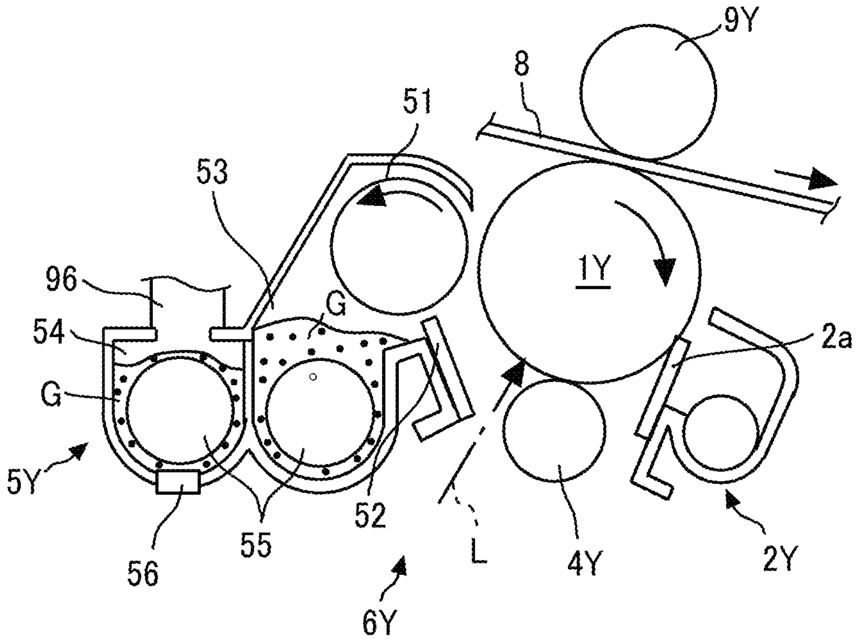
FIG. 2 is a cross-sectional view of an image forming device of the image forming apparatus in FIG. 1.
Figure 3:
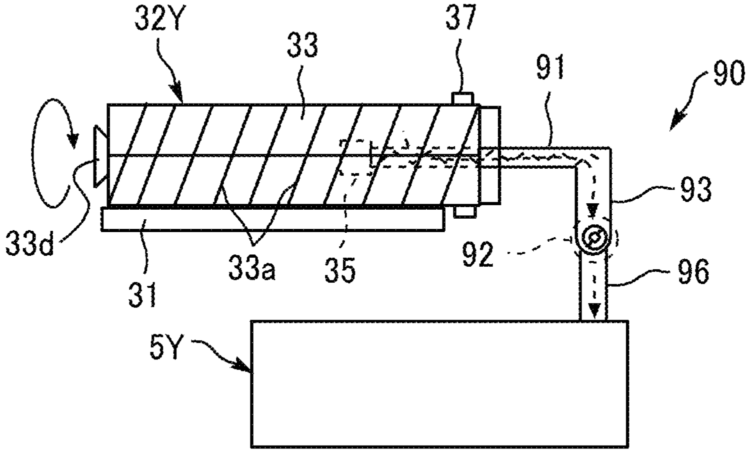
FIG. 3 is a schematic view of a toner supply device (powder conveying device) and the vicinity thereof.

With reference to FIGS. 1 to 3, an overall configuration and operation of an image forming apparatus 100 are described below. FIG. 1 is a schematic view of a printer as the image forming apparatus 100. FIG. 2 is an enlarged view of an image forming device of the image forming apparatus 100. FIG. 3 is a schematic view of a toner supply device serving as a powder conveying device and the vicinity thereof. As illustrated in FIG. 1, the image forming apparatus 100 includes an installation section 31 (serving as a toner container rack) in an upper portion of a body of the image forming apparatus 100. Substantially cylindrical toner containers 32Y, 32M, 32C, and 32K are detachably (replaceably) attached to the installation section 31. The four toner containers 32Y, 32M, 32C, and 32K correspond to four colors, that is, yellow, magenta, cyan, and black, respectively. An intermediate transfer unit 15 is disposed below the installation section 31. Image forming devices 6Y, 6M, 6C, and 6K corresponding to colors of yellow, magenta, cyan, and black, respectively, are arranged side by side to face an intermediate transfer belt 8 of the intermediate transfer unit 15.

With reference to FIG. 2, the image forming device 6Y for yellow includes a photoconductor drum 1Y (serving as an image bearer), a charging device 4Y, a developing device 5Y, a cleaning device 2Y, and a discharging device that are disposed around the photoconductor drum 1Y. Image forming processes (i.e., charging process, exposure process, development process, transfer process, cleaning process, and charge eliminating process) are executed on the photoconductor drum 1Y. Thus, a yellow toner image is formed on the surface of the photoconductor drum 1Y.

The other three image forming devices 6M, 6C, and 6K have substantially similar configuration to that of the image forming device 6Y for yellow except for the color of toner used therein and form magenta, cyan, and black toner images, respectively. Only the image forming device 6Y for yellow is described below and descriptions of the other three image forming devices 6M, 6C, and 6K are omitted to avoid redundancy.

As illustrated in FIG. 2, the photoconductor drum 1Y is driven to rotate clockwise in FIG. 2 by a motor. The charging device 4Y uniformly charges the surface of the photoconductor drum 1Y (a charging process). When the surface of the photoconductor drum 1Y reaches a position at which the surface of the photoconductor drum 1Y is irradiated with laser beam L emitted from an exposure device 7 (a writing device, see FIG. 1), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, at the position, the electrostatic latent image is developed with the toner into a yellow loner image (a development process). When the surface of the photoconductor drum 1Y bearing the toner image reaches a position facing a primary transfer roller 9Y via the intermediate transfer belt 8, at the position, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (a cleaning process), Finally, the surface of the photoconductor drum 1Y reaches a position facing the discharging device, and the discharging device removes residual potentials from the photoconductor drum 1Y. Thus, a series of image forming processes performed on the surface of the photoconductor drum 1Y is completed.

Note that the other image forming devices 6M, 6C, and 6K execute the series of image forming processes described above in substantially same manner as the image forming device 6Y. That is, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Specifically, in the exposure device 7, a light source emits the laser beam L, which is deflected by a polygon mirror rotated. The laser beam L then reaches the photoconductor drum 1 via multiple optical elements. Thus, the exposure device 7 scans the surface of each of the photoconductor drums 1M, 1C, and 1K with the laser beam L. Then, the toner images formed on the photoconductor drums 1M, 1C, and 1K through the development process are transferred and superimposed on the intermediate transfer belt 8. Thus, a color toner image is formed on the intermediate transfer belt 8.

The intermediate transfer unit 15 includes the intermediate transfer belt 8, four primary transfer rollers 9Y, 9M, 9C, and 9K, a secondary transfer counter roller 12, a cleaning backup roller 13, a tension roller 14, and an intermediate transfer cleaning device 10. The intermediate transfer belt 8 is extended and supported by the secondary transfer counter roller 12, the cleaning backup roller 13, and the tension roller 14. The secondary transfer counter roller 12 serves as a driving roller to rotate the intermediate transfer belt 8 in the direction (counterclockwise) indicated by an arrow in FIG. 1.

Each of the four primary transfer rollers 9Y, 9M, 9C, and 9K nips the intermediate transfer belt 8 with the corresponding one of the photoconductor drums 1Y, 1M, 1C, and 1K to form an area of contact, herein called a primary transfer nip, between the intermediate transfer belt 8 and the corresponding one of the photoconductor drums 1Y, 1M, 1C, and 1K. A primary-transfer bias opposite in polarity to the toner is applied to the primary transfer rollers 9Y, 9M, 9C, and 9K. The intermediate transfer belt 8 travels in the direction (counterclockwise) indicated by an arrow in FIG. 1 and sequentially passes through the primary transfer nips of the primary transfer rollers 9Y, 9M, 9C, and 9K. As a result, the single-color toner images on the photoconductor drums 1Y, 1M, 1C, and 1K, having the respective colors, are primarily transferred to and superimposed onto the intermediate transfer belt 8, thereby forming the multicolor toner image (a primary transfer process).

Subsequently, the intermediate transfer belt 8 that the toner images of the respective colors are transferred to and superimposed onto reaches a position opposite a secondary transfer roller 19. At the position, the intermediate transfer belt 8 is nipped between the secondary transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At that time, the untransferred toner that has not transferred onto the sheet P remains on the surface of the intermediate transfer belt 8.

The surface of the intermediate transfer belt 8 then reaches a position opposite the intermediate transfer cleaning device 10. At the position, the intermediate-transfer-belt cleaner collects the untransferred toner from the surface of the intermediate transfer belt 8. As a result, a series of transfer processes executed on the outer circumferential surface of the intermediate transfer belt 8 is completed.

The sheet P is conveyed from a sheet feeder 26 disposed in a lower portion of the body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 (serving as a timing roller pair) temporarily stops at the roller nip between the rollers of the registration roller pair 28 that has stopped rotating. Rotation of the registration roller pair 28 is timed to convey the sheet P toward the secondary transfer nip such that the sheet P meets the color toner image on the intermediate transfer belt 8 at the secondary transfer nip. Thus, the desired color image is transferred onto the sheet P.

Subsequently, the sheet P, onto which the color toner image is transferred at the secondary transfer nip, is conveyed to a position of a fixing device 20. Then, at this position, the color toner image transferred to the surface of the sheet P is fixed on the sheet P by heat and pressure of the fixing roller and the pressure roller (a fixing process). Thereafter, the sheet P is conveyed through the rollers of an output roller pair 29 and ejected to the outside of the image forming apparatus 100. The sheets P ejected by the output roller pair 29 to the outside of the image forming apparatus 100 are sequentially stacked as output images on a stack tray 30. Thus, a series of image forming processes performed by the image forming apparatus 100 is completed.

Next, a detailed description is provided of a configuration and operation of the developing device 5Y (supply destination) of the image forming device 6Y with reference to FIG. 2. The developing device 5Y includes a developing roller 51, a doctor blade 52, two conveying screws 55, and a toner concentration sensor 56. The developing roller 51 faces the photoconductor drum 1Y. The doctor blade 52 faces the developing roller 51. The two conveying screws 55 are disposed within developer housings 53 and 54. The toner concentration sensor 56 detects a concentration of toner in developer G. The developing roller 51 includes magnets and a sleeve. The magnets are fixed inside the developing roller 51. The sleeve rotates around the magnets. The developer housings 53 and 54 contain the two-component developer G including carrier (i.e., carrier particles) and toner (i.e., toner particles).

The developing device 5Y described above operates as follows. The sleeve of the developing roller 51 rotates in the direction indicated by an arrow in FIG. 2. The developer G is borne on the developing roller 51 by a magnetic field generated by the magnets. As the sleeve rotates, the developer G moves along the circumference of the developing roller 51. The developer G in the developing device 5Y is adjusted so that the ratio of toner (i.e., toner concentration) in the developer G is within a predetermined range. Specifically, a toner supply device 90 (see FIG. 3) serving as a powder conveying device that supplies toner from the toner container 32Y to the developer housing 54 (see FIG. 2) according to the toner consumption in the developing device 5Y.

The toner (as powder) supplied in the developer housing 54 is stirred and mixed together with the developer G and circulated through the two developer housings 53 and 54 by the two conveying screws 55 (i.e., in a longitudinal direction perpendicular to the plane on which FIG. 2 is illustrated). The toner in the developer G is electrically charged by friction together with the carrier and thus is attracted to the carrier. Both the toner and the carrier are borne on the developing roller 51 due to a magnetic force generated on the developing roller 51. The developer G borne on the developing roller 51 is conveyed in a direction (counterclockwise) indicated by an arrow in FIG. 3 and reaches a position opposite a doctor blade 52. The doctor blade 52 adjusts the amount of the developer borne on the developing roller 51 to an appropriate amount. Thereafter, the developer G on the developing roller 51 is conveyed to a position opposite the photoconductor drum 1Y (a developing area). The toner is attracted to the electrostatic latent image formed on the photoconductor drum 1Y by an electric field generated in the developing area. Subsequently, as the sleeve rotates, the developer G remaining on the developing roller 51 reaches an upper portion of the developer housing 53 and separates from the developing roller 51.

Next, with reference to FIG. 3, a configuration and operation of the toner supply device 90 serving as the powder conveying device are briefly described. The toner supply device 90 rotationally drives a container body 33 of the toner container 32Y (a powder container) installed in the installation section 31 in a predetermined direction (in the direction indicated by arrow in FIG. 3), discharges the toner (as the powder) contained in the toner container 32Y to the outside of the toner container 32Y, and guides the toner to the developing device 5Y via a first conveyance passage 91, a fall passage 93 (a first fall passage), a second conveyance passage 92, and a conveying tube 96 (a second conveyance passage). The toner supply device 90 includes a toner supply passage (a toner conveyance passage).

The toner supply devices 90 supply the color toners contained in the toner containers 32Y, 32M, 32C, and 32K installed in the installation section 31 in the body of the image firming apparatus 100 to the corresponding developing devices 5Y, 5M, 5C, and 5K, respectively. The amount of toner supplied to each developing device 5 is determined based on the amount of toner consumed in the corresponding developing device 5. The four toner supply devices 90 have a similar configuration except the color of the toner used in the image forming processes. Specifically, with reference to FIG. 3 (and FIGS. 5A to 5C), when the toner container 32Y is attached to the installation section 31 of the body of the image forming apparatus 100, the first conveyance passage 91 (nozzle) of the body of the image forming apparatus 100 pushes and moves a shutter 35 of the toner container 32Y. As a result, the first conveyance passage 91 is inserted into the toner container 32Y (container body 33) via a through-hole 34*a*1. Accordingly, the toner stored in the toner container 32Y can be discharged through the first conveyance passage 91. The toner container 32Y includes a gripper 33*d* at the bottom portion (i.e., left side in FIG. 3) of the toner container 32Y so that a user easily attaches the toner container 32Y to the installation section 31. The user grips the gripper 33*d* to install the toner container 32Y in the installation section 31 and take out the toner container 32Y from the installation section 31.

Referring to FIG. 3, the toner container 32Y includes the container body 33 having a spiral groove 33*a* extending in the longitudinal direction i.e., the left and right direction in FIG. 3) and the axial direction of the container body 33. Specifically, the spiral groove 33*a* is formed from an outer circumferential surface toward an inner circumferential surface of the container body 33 so that a rotation of the container body 33 convey the toner in the container body 33 from the left side to the right side in FIG. 3. The toner conveyed from the left side to the right side in FIG. 3 inside the container body 33 is discharged to the outside of the toner container 32Y through the first conveyance passage 91. A gear 37 is disposed on the outer circumferential surface of the head of the container body 33 (i.e., right side of the container body 33 in FIG. 3). The gear 37 meshes with a gear 115 of a drive mechanism 110 (see FIG. 7) of the body of the image forming apparatus 100 (toner supply device 90). When the toner container 32Y is attached to the installation section 31, the gear 37 of the container body 33 meshes with the gear 115 (see FIG. 7) of the body of the image forming apparatus 100. As a drive motor 111 (see FIG. 7) is driven, the driving force is transmitted to the gear 37 via a gear train, thus driving the container body 33 to rotate. The configuration and operation of the toner supply device 90 are described in detail below with reference to FIGS. 6 and 7.

With reference to FIGS. 4, 5A, 5B, and 5C, a detailed description is provided of the toner containers 32Y, 32M, 32C, and 32K further in detail below. FIGS. 4, 5A, 5B, and 5C are cross-sectional side views of the toner container 32Y. The drawings are illustrated from the direction opposite to the drawing direction of the toner container 32Y in FIG. 3. The drawings are reversed left and right).

As described above with reference to FIGS. 1 to 3, the toner container 32Y stores toner therein and is detachably attached to the body of the image forming apparatus 100. Referring to FIGS. 4, 5A, 5B, and 5C, the toner container 32Y includes the container body 33 and a shutter unit (i.e., including a holder 34, the shutter 35, a rod 36, and a compression spring 38). The shutter unit includes, for example, the holder 34, the shutter 35, the rod 36, and the compression spring 38. The holder 34 has an attachment 34*a* that functions as a cap. The container body 33 is fixed to the attachment 34*a* (i.e., the holder 34) and is a bottle with the spiral groove 33*a* formed on the inner circumferential surface of the container body 33. The holder 34 (and the shutter 35, the rod 36, and the compression spring 38) having the attachment 34*a*, and the container body 33 are driven to rotate by the drive motor 111 (drive mechanism 110) disposed in the body of the image forming apparatus 100 in a state in which the toner container 32Y is installed in the body of the image forming apparatus 100 (installation section 31), The toner stored in the toner container 32Y is discharged via the first conveyance passage 91.

With reference to FIGS. 4, 5A, 5B, and 5C, the shutter 35 opens and closes the through-hole 34*a*1 to which the first conveyance passage 91 (which is installed in the toner supply device 90) is inserted in conjunction with the installation operation of the toner container 32Y to the body of the image forming apparatus 100. The shutter 35 is made of a resin material and molded integrally together with the rod 36 which is described below. The shutter 35 is fitted into the through-hole 34*a*1 from the inside of the toner container 32Y and latched so as not to detach from the container body 33. Toner is not discharged to the outside of the toner container 32Y in the state in which the through-hole 34*a*1 is closed by the shutter 35. Toner is discharged to the outside of the toner container 32Y in the state in which the through-hole 34*a*1 is opened by the shutter 35. The through-hole 34*a*1 is a through-hole having a substantially columnar shape centered on the center of rotation of the container body 33. The shutter 35 is a stopper-shaped member to fit into the through-hole 34*a*1 having such a cylindrical shape.

Figure 4:
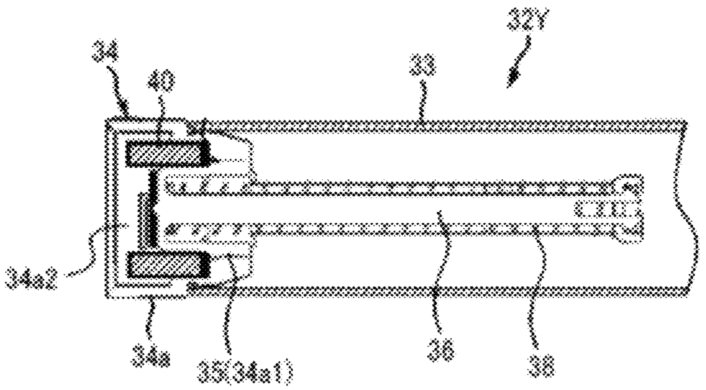
FIG. 4 is a cross-sectional view of a main part of a toner container.

The toner container 32Y includes a seal 40 to seal a gap between the shutter 35 and the through-hole 34*a*1 with the through-hole 34*a*1 being closed by the shutter 35. The rod 36 is united with the shutter 35. The rod 36 extends in the opening and closing directions of the shutter 35 (i.e., the left and right direction in FIGS. 4, 5A, 5B, and 5C) inside the toner container 32Y. As illustrated in FIG. 4, the rod 36 is disposed so that the axis of the rod 36 substantially coincides with the rotation center of the container body 33. Such a configuration restrains a failure such as a positional displacement of the shutter 35 when the container body 33 is rotationally driven.

With reference to FIGS. 4, 5A, 5B, and 5C, the holder 34 includes the attachment 34*a* (i.e., the cap) and an extending portion 34*b*, and is secured to the container body 33. The holder 34 receives a rotational driving force from the body of the image forming apparatus and rotates around the first conveyance passage 91 with the container body 33. The attachment 34*a* (the cap) of the holder 34 has the through-hole 34*a*1 and is vertically arranged in the direction in which the first conveyance passage 91 is inserted (i.e., the insertion direction, and the left and right direction in FIGS. 4, 5A, 5B, and 5C). The attachment 34*a* has an opening portion 34*a*2 (a cavity) that opens toward the front side in the insertion direction of the first conveyance passage 91 (i.e., upstream in the insertion direction and the left side of the toner container 32Y in FIGS. 4, 5A, 5B, and 5C). The opening portion 34*a*2 is a concave portion having a substantially columnar shape centered on the rotation center of the container body 33.

The extending portion 34*b* of the holder 34 holds the rod 36 movably in the opening and closing directions on the opposite side (i.e., the right side in FIGS. 4, 5A, 5B, and 5C) on which the shutter 35 is disposed inside the toner container 32Y, The extending portion 34*b* is formed in a substantially horseshoe shape so as to extend in the left and right direction of FIGS. 4, 5A, 5B, and 5C inside the toner container 32Y (i.e., the container body 33). The compression spring 38 as a biasing member is wound around the rod 36 between the shutter 35 and a wall of the extending portion 34*b*. The compression spring 38 biases the shutter 35 in the direction to which the through-hole 34*a*1 is closed (i.e., toward the left side in FIGS. 4, 5A, 5B, and 5C).

Figure 5A:
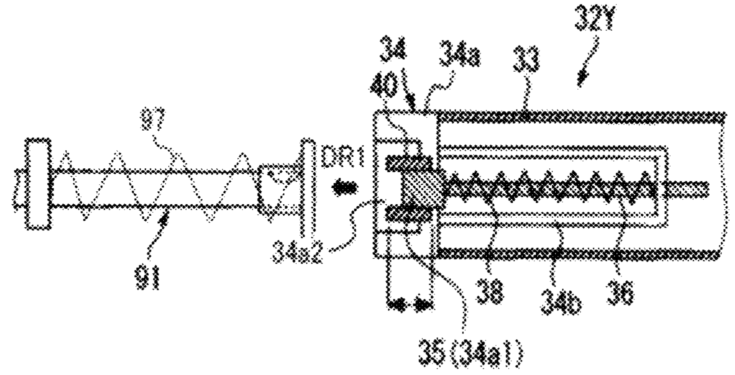
FIG. 5A is a diagram illustrating a state before an attachment operation of a first conveyance passage to the toner container is started.

In such a configuration, the shutter 35 is pushed by the first conveyance passage 91 in conjunction with the installation operation of the toner container 32Y to the body of the image forming apparatus 100 (i.e., the installation section 31). The shutter 35 moves to the inside of the toner container 32Y with the rod 36 against the biasing force of the compression spring 38 (i.e., the biasing member) and opens the through-hole 34*a*1. Specifically, the shutter 35 (and the rod 36) moves in the order as illustrated in FIGS. 5A and 5C to open the through-hole 34*a*1. In contrast, removing the toner container 32Y from the body of the image forming apparatus 100 (the installation section 31) causes the first conveyance passage 91 to release the shutter 35 from the above-described pushed state, and the biasing force of the compression spring 38 moves the shutter 35 together with the rod 36 toward the through-hole 34*a*1 to close the through-hole 34*a*1. Specifically, the shutter 35 (and the rod 36) moves in the order as illustrated in FIGS. 5C and 5A to close the through-hole 34*a*1. As illustrated in FIG. 5C, when the installation of the toner container 32Y in the body of the image forming apparatus 100 is completed, the shutter 35 contacts the wall of the extending portion 34*b*, and the compression spring 38 is stored in the concave portion of the shutter 35. Such a configuration can prevent a problem that toner in the toner container 32Y adheres to the compression spring 38 when the toner container 32Y is set in the body of the image forming apparatus 100.

Figure 5B:
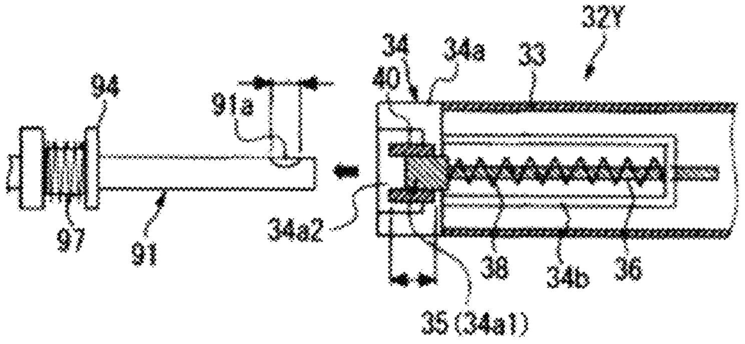
FIG. 5B is a diagram illustrating a state in which the attachment operation of the first conveyance passage to the toner container is performed.
Figure 5C:
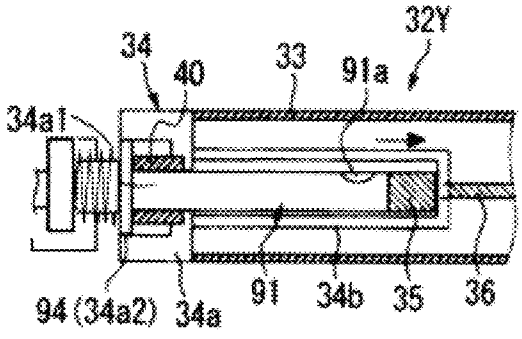
FIG. 5C is a diagram illustrating a state in which the attachment operation of the first conveyance passage to the toner container is completed.

With reference to FIGS. 5A to 5C, the first conveyance passage 91 in the present embodiment has a fitting portion 94 to fit the opening portion 34*a*2 in conjunction with the insertion operation of the first conveyance passage 91 to the through-hole 34*a*1. Specifically, the fitting portion 94 has an outer diameter larger than the outer diameter of a main portion of the first conveyance passage 91. The fitting portion 94 has a substantially columnar shape to engage the opening portion 34*a*2 of the attachment 34*a*. The fitting portion 94 is slidable along the main portion of the first conveyance passage 91 in the installation direction of the toner container 32Y indicated by arrow DR1 in FIGS. 5A and 5B. A compression spring 97 is disposed in the first conveyance passage 91 to bias the fitting portion 94 downstream (right side in FIGS. 5A to 5C) in the insertion direction. The fitting portion 94 also functions as a cover that covers a first inlet port 91*a* of the first conveyance passage 91. As illustrated in FIG. 5A, the fitting portion 94 closes the first inlet port 91*a* when the toner container 32Y is not set. As illustrated in FIG. 5C, the fitting portion 94 slides and moves, and the main part of the first conveyance passage 91 is inserted inside the container body 33 when the toner container 32Y is set. FIG. 5B illustrates a state in which the first inlet port 91*a* is exposed by sliding the fitting portion 94. With such a configuration, when the first conveyance passage 91 is inserted into the toner container 32Y in conjunction with the installation operation of the toner container 32Y, the fitting portion 94 is biased by the compression spring 97 to fit the opening portion 34*a*2. In contrast, when the first conveyance passage 91 is pulled out from the toner container 32Y in conjunction with the detaching operation of the toner container 32Y, the fitting portion 94 is pulled out from the opening portion 34*a*2.

Figure 6:
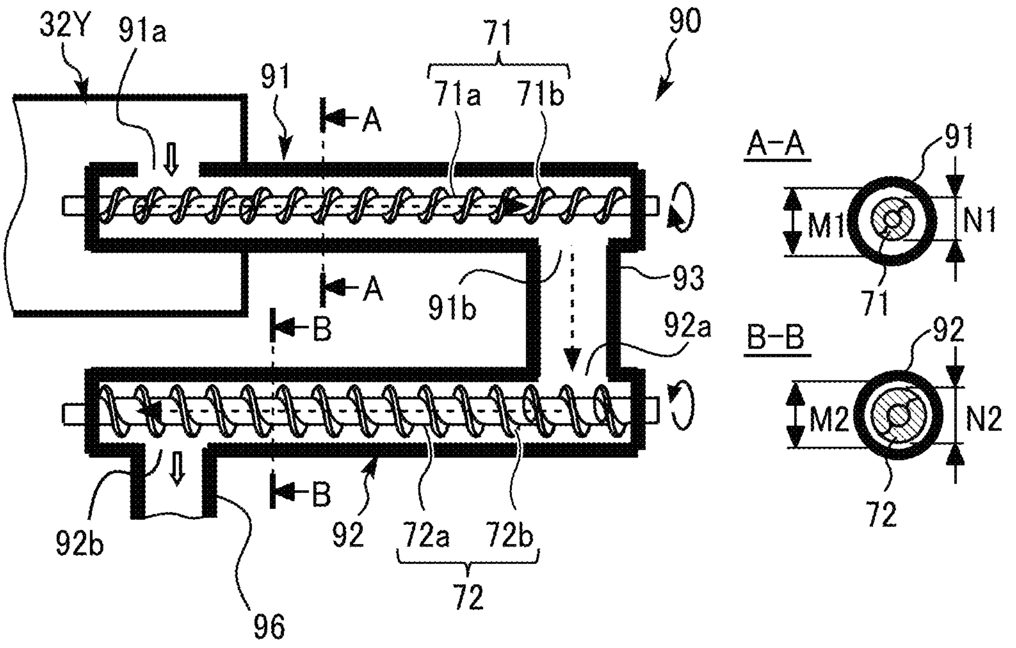
FIG. 6 is a schematic view of the toner supply device (powder conveying device)
Figure 7:
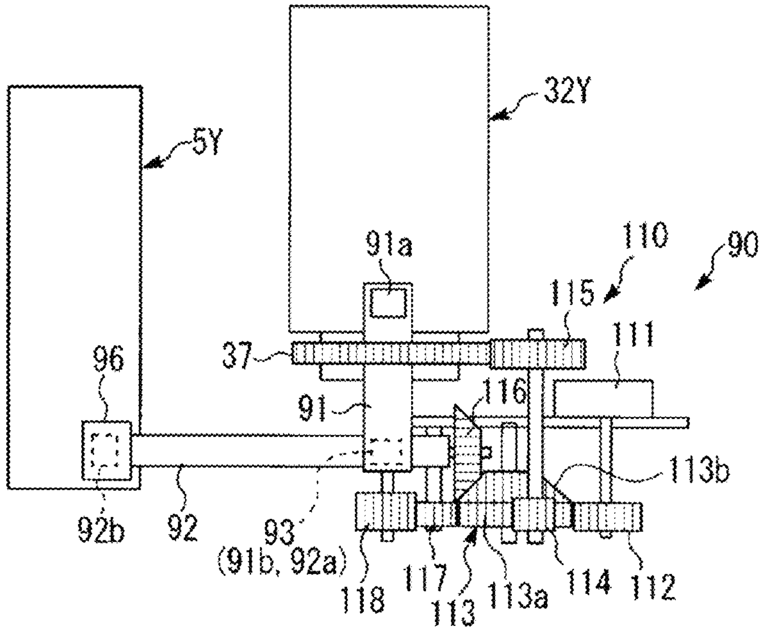
FIG. 7 is a schematic view of a driver of the toner supply device.

With reference to FIGS. 6 and 7, the configuration and operation of the toner supply device 90 as a powder conveying device in the present embodiment is described below. To easily understand the configuration of the toner supply device 90, the arrangement direction of the second conveyance passage 92 with respect to the first conveyance passage 91 is illustrated in FIG. 6 in different orientations from the actual arrangement. Actually, as illustrated in FIGS. 3 and 7, the second conveyance passage 92 is disposed to be substantially orthogonal to the first conveyance passage 91.

With reference to FIGS. 6 and 7, a toner supply device 90 as a powder conveying device is provided with, i.e., the first conveyance passage 91, the fall passage 93 (first fall passage), the second conveyance passage 92, and the conveying tube 96 (second fall passage). The toner as powder discharged from the toner container 32Y is conveyed toward the developing device 5Y via the conveyance passages 91 to 93 and 96.

The first conveyance passage 91 includes a first conveying screw 71 serving as a first conveyor that conveys the toner (powder) in a substantially horizontal direction. The first conveying screw 71 includes a shaft portion 71*a* and a screw portion 71*b*. The screw portion 71*b* is spirally wound around the shaft portion 71*a*. The first conveying screw 71 is made of a metal material or a resin material. In the present embodiment, the outer diameter N1 (screw diameter) of the first conveying screw 71 is set to about 9.1 mm. The first conveyance passage 91 is a conveying tube having a circular cross section and is made of a metal material or a resin material. In the present embodiment, the inner diameter M1 (inner circumferential diameter) of the first conveyance passage 91 is set to about 11.2 mm. In the first conveyance passage 91, the first inlet port 91*a* that communicates with the toner container 32Y is formed upstream from the first conveyance passage 91. A first outlet port 91*b* (outlet port) that communicates with the fall passage 93 is formed downstream from the first conveyance passage 91.

The fall passage 93 is a passage through which the toner having flowed out from the outlet port (first outlet port 91*b*) of the first conveyance passage 91 falls (falls by its own weight) and is formed to extend in a substantially vertical direction. The fall passage 93 may be a conveying tube having a circular cross section or a conveying tube having a polygonal cross section. The fall passage 93 may be inclined with respect to the vertical direction. In this case, a state in which the toner slides down on an inclined surface of the inclined fall passage 93 is also defined as a state in which "the toner (powder) falls". In the present embodiment, a passage that relays between the first conveyance passage 91 and the second conveyance passage 92 is used as the fall passage 93. Even when the first conveyance passage 91 and the second conveyance passage 92 are arranged side by side to be in close contact with each other in the substantially vertical direction, it is defined that the fall passage 93 is formed in the intermediate portion.

The second conveyance passage 92 is provided with a second conveying screw 72 serving as a second conveyor. When the toner that has fallen in the fall passage 93 flows in from an inlet port (a second inlet port 92*a*), the second conveying screw 72 conveys the toner in a substantially horizontal direction. The second conveying screw 72 includes a shaft portion 72*a* and a screw portion 72*b*. The screw portion 72*b* is spirally wound around the shaft portion 72*a*. The second conveying screw 72 is made of a metal material or a resin material. In the present embodiment, the outer diameter N2 (screw diameter) of the second conveying screw 72 is set to about 7.9 mm. The second conveyance passage 92 is a conveying tube having a circular cross section and is made of a metal material or a resin material. In the present embodiment, the inner diameter M2 (inner circumferential diameter) of the second conveyance passage 92 is set to about 8.3 mm. In the second conveyance passage 92, the second inlet port 92*a* that communicates with the toner container 32Y is formed upstream from the second conveyance passage 92. A second outlet port 92*b* that communicates with the conveying tube 96 (second fall passage) is formed downstream from the second conveyance passage 92.

The conveying tube 96 (second fall passage) is a passage through which the toner having flowed out from the second outlet port 92*b* of the second conveyance passage 92 falls (falls by its own weight) and is formed to extend in a substantially vertical direction. The toner fallen from the conveying tube 96 by its own weight is supplied into the developing device 5Y. Although the toner is conveyed from the second conveyance passage 92 to the developing device 5Y via the conveying tube 96 in the present embodiment, the toner may be directly conveyed from the second conveyance passage 92 to the developing device 5Y.

As illustrated in FIG. 6, in the toner supply device 90 (powder conveying device) with a configuration as described above, the toner that flows from the toner container 32Y into the first conveyance passage 91 in the direction indicated by a white arrow is conveyed substantially horizontally (in the direction indicated by a dashed arrow) from the left side to the right side by the first conveying screw 71 that rotates in a specified direction. Thus, the toner falls by its own weight in the direction indicated by a dashed arrow (from above to below) via the fall passage 93. Thereafter, the toner that flows into the second conveyance passage 92 from the fall passage 93 is conveyed from the right side to the left side in a substantially horizontal direction (i.e., a direction indicated by a dashed arrow in FIG. 6) by the second conveying screw 72 that rotates in a specified direction. Thereafter, the toner that flows into the conveying tube 96 from the second conveyance passage 92 falls in the conveying tube 96 by its own weight. Thus, the toner flows into the developing device 5Y.

The plurality of conveyance passages 91 to 93 and 96 in the toner supply device 90 as described above are disposed so that the toner can be supplied even when the toner container 32Y serving as a supply source and the developing device 5Y serving as a supply destination are separated from each other or the directions thereof are different from each other. In other words, flexibility of the layout of the toner container 32Y and the developing device 5Y can be enhanced. In particular, with reference to FIG. 7, in the present embodiment, a conveyance direction in which the toner (powder) is conveyed in the first conveyance passage 91 and a conveyance direction in which the toner is conveyed in the second conveyance passage 92 are in an intersecting relationship i.e., in the present embodiment, a substantially orthogonal relationship). As a result, the flexibility of the layout of the toner container 32Y and the developing device 5Y can be further enhanced.

In the toner supply device 90 according to the present embodiment, when viewed in a cross section orthogonal to the conveying direction in which the toner (powder) is conveyed, a cross-sectional area of a space that is not occupied by the first conveying screw 71 (first conveyor) in the first conveyance passage 91 is larger than a cross-sectional area of a space that is not occupied by the second conveying screw 72 (second conveyor) in the second conveyance passage 92. With reference to FIG. 6, an area occupied by a non-hatched white portion in the first conveyance passage 91 in the A-A sectional view is set to be larger than an area occupied by a non-hatched white portion in the second conveyance passage 92 in the B-B sectional view. Specifically, in the present embodiment, when the area occupied by the non-hatched white portion in the first conveyance passage 91 in the A-A cross section is 1, the area occupied by the non-hatched white portion in the second conveyance passage 92 in the B-B cross section is 0.2.

Accordingly, even in the toner supply device 90 provided with the plurality of conveyance passages 91 to 93, clogging (conveyance failure) of the toner in the conveyance passages is less likely to occur. Specifically, typically, in a toner supply device (powder conveying device) provided with a plurality of conveyance passages, when a toner conveyance speed (i.e., an amount of the toner conveyed by a conveyor per unit time) in a downstream conveyance passage is lower than a toner conveyance speed in an upstream conveyance passage, toner clogging is likely to occur in the conveyance passage, particularly, in the vicinity of an outlet port (connecting portion) of the upstream conveyance passage. In order to prevent such toner clogging, a toner conveyance speed in the downstream conveyance passage may be set faster than a toner conveyance speed in the upstream conveyance passage. However, when the toner conveyance speed in the downstream conveyance passage is faster than the toner conveyance speed in the upstream conveyance passage, toner is likely to be insufficient in the downstream conveyance passage. Thus, a failure of toner supply from a supply source to the supply destination is likely to occur. In contrast, in the present embodiment, a cross-sectional area of a space not occupied by the first conveying screw 71 in the first conveyance passage 91 is set to be larger than a cross-sectional area of a space not occupied by the second conveyance passage 92. Even if the toner conveyance speed in the second conveyance passage 92 is not set to be higher than the toner conveyance speed in the first conveyance passage 91, the large unoccupied space serves as a space that avoids toner clogging. Thus, toner clogging (a conveyance failure) is less likely to occur. Since the unoccupied space is small in the second conveyance passage toner can be efficiently conveyed without lowering the toner conveyance performance in the second conveyance passage 92. As a result, a toner supplying device 90 according to the present embodiment is less likely to cause a toner conveyance failure as a whole. Thus, the toner supplying device 90 can stably supply toner from the toner container 32Y (supply source) to the developing device 5Y (supply destination) without excess or deficiency.

With reference to FIG. 6, in the toner supply device 90 (powder conveying device) according to the present embodiment, when viewed in a cross section orthogonal to the conveying direction in which toner (powder) is conveyed, a clearance between an inner diameter portion (inner circumferential portion) of the first conveyance passage 91 and an outer diameter portion of the first conveying screw 71 (screw portion 71*b*) is set to be larger than a clearance between an inner diameter portion (inner circumferential portion) of the second conveyance passage 92 and an outer diameter portion of the second conveying screw 72 (screw portion 72*b*). When the inner diameter of the first conveyance passage 91 is defined as M1, the outer diameter (diameter of the screw) of the first conveying screw 71 (screw portion 71*b*) is defined as N1, the inner diameter of the second conveyance passage 92 is defined as M2, and the outer diameter (diameter of the screw) of the second conveying screw 72 (screw portion 72*b*) is defined as N2, a relationship of "$M1-N1>M2-N2$" is established. Accordingly, for the same reason as described above, in the toner supply device 90 provided with the plurality of conveyance passages 91 to 93, even if the toner conveyance speed in the second conveyance passage 92 is not set to be higher than the toner conveyance speed in the first conveyance passage 91, the large unoccupied space serves as a space that avoids toner clogging. Thus, toner clogging (a conveyance failure) is less likely to occur. Since a gap (clearance) is narrow in the second conveyance passage 92, toner can be efficiently conveyed without lowering the toner conveyance performance in the second conveyance passage 92. As a result, a toner supplying device 90 according to the present embodiment is less likely to cause a toner conveyance failure as a whole. Thus, the toner supplying device 90 can stably supply toner from the toner container 32Y (supply source) to the developing device 5Y (supply destination) without excess or deficiency.

In the present embodiment, when an inner diameter of the first conveyance passage 91 is defined as M1 and an outer diameter of the first conveying screw 71 (first conveyor) is defined as N1, a relationship "$M1\times0.75\leq N1\leq M1\times0.9$" is satisfied. In a case in which "$N1<M1\times0.75$" is established, an area (or a clearance) of the unoccupied space is too large, and the toner conveyance performance (including not only the toner conveyance performance in the forward direction but also the toner conveyance performance in the direction in reverse) in the first conveyance passage 91 is lowered. Thus, stagnation of toner is likely to occur. As a result, toner may aggregate, and the aggregated toner supplied to the developing device 5Y may cause occurrence of abnormal images. In a case in which "$N1>M1\times0.9$" is established, an area (or a clearance) of the unoccupied space is too small. Thus, the unoccupied space (or the clearance) is less likely to be a space that avoids toner clogging. As a result, an effect of reducing clogging (conveyance failure) of toner may not sufficiently performed. In contrast, in the present embodiment, since a relationship between the inner diameter M1 of the first conveyance passage 91 and the outer diameter N1 of the first conveying screw 71 is set within the above-described range, the above-described failure is less likely to occur.

In the present embodiment, an amount of powder (toner) per unit time conveyed by the first conveying screw 71 (first conveyor) is set to be larger than an amount of powder (toner) per unit time conveyed by the second conveying screw 72. The above-described "amount of powder (toner) per unit time" is the "toner conveyance speed in the conveyance passage". In the present embodiment, the number of rotations per unit time of the first conveying screw 71 is set to 190 rotations per minute (rpm), the outer diameter N1 of the screw portion 71*b* is set to 9.1 mm, and the screw pitch of the screw portion 71*b* is set to 12.5 mm. The number of rotations per unit time of the second conveying screw 72 is set to 237 rpm, the outside diameter N2 of the screw portion 72*b* is set to 7.9 mm, and the screw pitch of the screw portion 72*b* is set to 11 mm. As a result, the amount of powder per unit time conveyed by the first conveying screw 71 is about 5% larger than the amount of powder per unit time conveyed by the second conveying screw 72. With such a setting, the toner that flows from the toner container 32Y is sufficiently filled in the first conveyance passage 91. Thus, even if a large amount of toner is consumed in the developing device 5Y serving as a supply destination when an image having a high image area ratio is printed, a toner supply failure is less likely to occur.

With reference to FIG. 7, the toner supply device 90 (powder conveying device) according to the present embodiment includes the drive mechanism 110 as a driver that drives the first conveying screw 71 (first conveyor) and drives the second conveying screw 72 (second conveyor). That is, in the present embodiment, a driver for driving the first conveying screw 71 and a driver for driving the second conveying screw 72 are not separately and independently disposed. Both the drivers are shared. In the present embodiment, the toner container 32Y (container body 33) is also driven by drivers for driving the first conveying screw 71 and the second conveying screw 72. As a result, reducing the cost and size of the apparatus can be achieved as compared with a case in which a plurality of drivers are independently disposed.

Specifically, with reference to FIG. 7, the drive mechanism 110 serving as a driver includes, i.e., the drive motor 111 and a plurality of gear trains 112, 113, 114, 117, and 118. The driving force of the drive motor 111 is transmitted from a drive gear 112 disposed on a motor shaft to the gear 37 of the toner container 32Y via idler gears 114 and 115. Thus, the toner container 32Y (container body 33) is driven to rotate. The driving force of the drive motor 111 is transmitted from the drive gear 112 disposed on the motor shall to a driven gear 118 of the first conveying screw 71 in the first conveyance passage 91 via a spur gear 113*a* of a two-step gear 113 and an idler gear 117. Thus, the first conveying screw 71 is driven to rotate. The driving force of the drive motor 111 is transmitted from the drive gear 112 disposed on the motor shaft to a bevel gear 116 of the second conveying screw 72 in the second conveyance passage 92 via the two-step gear 113 (in which the spur gear 113*a* and a bevel gear 113*b* are disposed in a stepped manner). Thus, the second conveying screw 72 is driven to rotate. In the drive mechanism 110 having a configuration as described above, when the drive motor 111 is driven by control of a controller, the toner container 32Y (container body 33), the first conveying screws 71, and the second conveying screw 72 are driven to rotate. The drive motor 111 is appropriately driven so that the ratio of toner (toner concentration) in the developer G in the developing device 5Y is detected by the toner concentration sensor 56 (see FIG. 2) and the detection result falls within a specified range. Specifically, each time the toner concentration detected by the toner concentration sensor 56 falls below a specified value, the drive motor 111 is driven for a specified time.

In the drive mechanism 110 having a configuration as described above, a backlash of the gears in the gear trains 112, 113, and 116 from the drive gear 112 of the drive motor 111 to the bevel gear 116 of the second conveying screw 72 is smaller than a backlash of the gears in the gear trains 112, 113*a*, 117, and 118 from the drive gear 112 of the drive motor 111 to the driven gear 118 of the first conveying screw 71. Accordingly, when the drive motor 111 is started to drive, the second conveying screw 72 starts to rotate slightly earlier than the first conveying screw 71. As a result, after the conveyance of toner is started in the second conveyance passage 92, toner flows into the second conveyance passage 92 from the first conveyance passage 91 via the fall passage 93. Thus, toner clogging in the second conveyance passage 92 is less likely to occur.

First Modification

Figure 8:
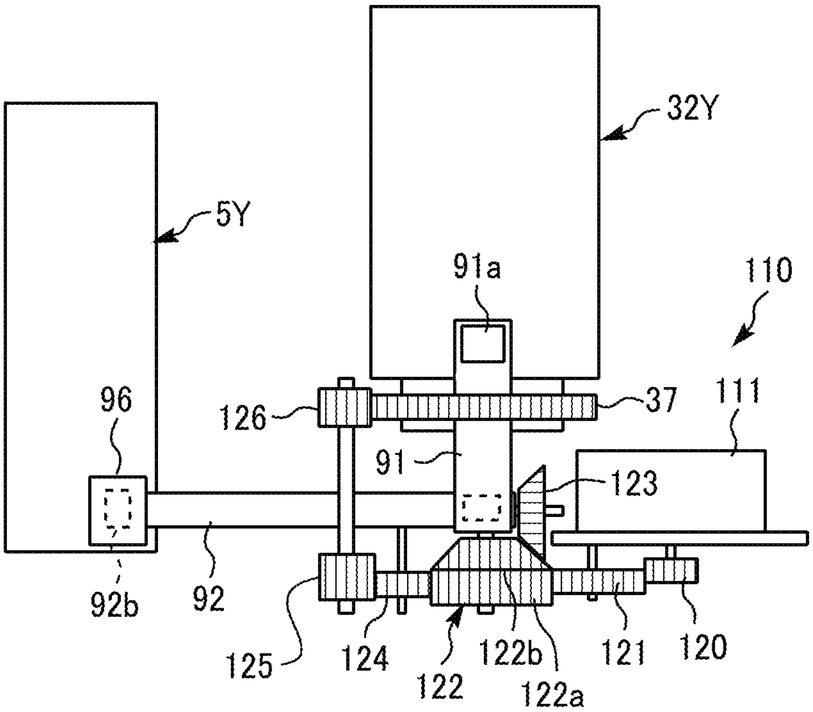
FIG. 8 is a schematic view of a driver of a toner supply device according to a first modification.

As illustrated in FIG. 8, in the toner supply device 90 (powder conveying device) according to a first modification, the arrangement of a gear train in the drive mechanism 110 as a driver is different from the arrangement of a gear train illustrated in FIG. 7. The drive mechanism 110 according to the first modification drives each of the first conveying screw 71, the second conveying screw 72, and the toner container 32Y (container body 33) in substantially the same manner as the configuration illustrated in FIG. 7. In the drive mechanism 110 according to the first modification, the driving force of the drive motor 111 is transmitted from a drive gear 120 disposed on the motor shaft to the gear 37 of the toner container 32Y via an idler gear 121, a spur gear 122*a* of a two-step gear 122, and idler gears 124, 125, and 126. Thus, the toner container 32Y (container body 33) is driven to rotate. The driving force of the drive motor 111 is transmitted from the drive gear 120 disposed on the motor shaft to the two-step gear 122 (spur gear 122*a*) of the first conveying screw 71 in the first conveyance passage 91 via the idler gear 121. Thus, the first conveying screw 71 is driven to rotate. The driving force of the drive motor 111 is transmitted from the drive gear 120 disposed on the motor shaft to a bevel gear 123 of the second conveying screw 72 in the second conveyance passage 92 via the idler gear 121 and the two-step gear 122 (the spur gear 122*a* and a bevel gear 122*b* are disposed in a stepped manner). Thus, the first conveying screw 71 is driven to rotate. Also in a case of using the drive mechanism 110 having a configuration as described above, the cost and size of the apparatus can be reduced as compared with a case in which a plurality of drivers are independently disposed. Also in the toner supply device 90 according to the first modification, a cross-sectional area of a space not occupied in the first conveyance passage 91 is set to be larger than a cross-sectional area of a space not occupied in the second conveyance passage 92. Thus, toner clogging (a conveyance failure) is less likely to occur.

Second Modification

Figure 9:
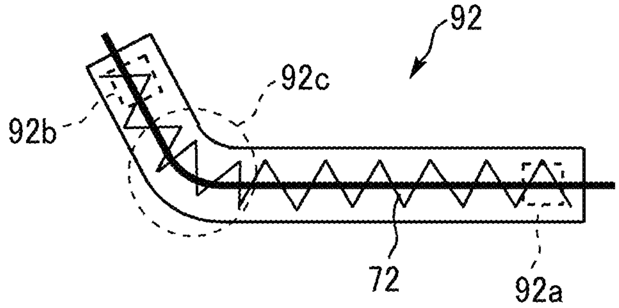
FIG. 9 is a top view of a second conveyance passage according to a second modification.

As illustrated in FIG. 9, the toner supply device 90 (powder conveying device) according to a second modification is provided with a curved conveyance passage (a curved conveyance passage 92*c*) in the second conveyance passage 92. The second conveying screw 72 (second conveyor) is made of an elastic material such as a rubber material and has elasticity to follow the shape of the second conveyance passage 92 (curved conveyance passage 92*c*). With such a configuration, the second conveyance passage

92 is provided with the curved conveyance passage 92*c*, through which tone is conveyable, to further enhance the flexibility of the layout of the toner container 32Y (supply source) and the developing device 5Y (supply destination). Also in the toner supply device 90 according to the second modification, a cross-sectional area of a space not occupied in the first conveyance passage 91 is set to be larger than a cross-sectional area of a space not occupied in the second conveyance passage 92. Thus, toner clogging (a conveyance failure) is less likely to occur.

As described above, the toner supply device 90 (powder conveying device) according to the present embodiment includes the first conveyance passage 91 in which the first conveying screw 71 (first conveyor) that conveys toner (powder) in a substantially horizontal direction is provided, the fall passage 93 in which the toner that flows out from the first outlet port 91*b* of the first conveyance passage 91 falls, and the second conveyance passage 92 in which the second conveying screw 72 (second conveyor) that conveys the toner in a substantially horizontal direction is disposed. The toner falling in the fall passage 93 flows in from the inlet port 92*a*. When viewed in a cross section orthogonal to the conveyance direction in which toner is conveyed, a cross-sectional area of a space that is not occupied by the first conveying screw 71 in the first conveyance passage 91 is larger than a cross-sectional area of a space that is not occupied by the second conveying screw 72 in the second conveyance passage 92. As a result, a conveyance failure of powder is less likely to occur.

In the above-described embodiments, the present disclosure is applied to the toner supply device 90 (powder conveying device) that conveys toner as powder. The application of the powder conveying device of the present disclosure is not limited thereto. The present disclosure can be applied to a powder conveying device that conveys powder, for example, waste toner, recycled toner, or two-component developer (developer containing toner and carrier). In the present embodiment, the present disclosure is applied to the toner supply device 90 (powder conveying device) that conveys toner (powder) from the toner container 32Y as a supply source to the developing device 5Y as a supply destination. The application of the supply source and the supply destination of the powder conveying device is not limited thereto. Various supply sources and supply destinations can be set. In the present embodiment, as the toner container 32Y serving as the supply source, a bottle-shaped container that discharges the toner by rotating the container body 33 is used. The toner container 32Y serving as the supply source is not limited thereto, and, for example, a container in which a conveyor that conveys the toner toward an outlet port is disposed, or a box-shaped container, can be used. Even in such a case, an advantageous effect equivalent to that of the present embodiment can be obtained.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A powder conveying device comprising:

a first screw to convey powder in a substantially horizontal direction;

a first conveyance passage in which the first screw is disposed;

a fall passage in which the powder output from an outlet port of the first conveyance passage is to fall;

a second screw to convey the powder in a substantially horizontal direction; and a second conveyance passage in which the second screw is disposed, the second conveyance passage having an inlet port to receive the powder falling in the fall passage, wherein a cross-sectional area of a space that is not occupied by the first screw in the first conveyance passage is larger than a cross-sectional area of a space that is not occupied by the second screw in the second conveyance passage when viewed in a cross section orthogonal to a conveyance direction in which the powder is conveyed, and wherein the first screw and the second screw are separate structures.

2. The powder conveying device according to claim 1, wherein a clearance between an inner diameter portion of the first conveyance passage and an outer diameter portion of the first screw is larger than a clearance between an inner diameter portion of the second conveyance passage and an outer diameter portion of the second screw when viewed in the cross section orthogonal to the conveyance direction in which the powder is conveyed.

3. The powder conveying device according to claim 1, wherein an amount of the powder per unit time conveyed by the first screw is larger than an amount of the powder per unit time conveyed by the second screw.

4. The powder conveying device according to claim 1, further comprising a driver to drive the first screw and the second screw.

5. The powder conveying device according to claim 1, wherein a conveyance direction in which the powder is conveyed in the first conveyance passage intersects a conveyance direction in which the powder is conveyed in the second conveyance passage.

6. The powder conveying device according to claim 1, wherein the second conveyance passage includes a curved conveyance passage, and wherein the second conveyor is elastic.

7. An image forming apparatus comprising the powder conveying device according to claim 1.

8. A powder conveying device comprising:

a first conveyor to convey powder in a substantially horizontal direction;

a first conveyance passage in which the first conveyor is disposed;

a fall passage in which the powder output from an outlet port of the first conveyance passage is to fall;

a second conveyor to convey the powder in a substantially horizontal direction; and a second conveyance passage in which the second conveyor is disposed, the second conveyance passage having an inlet port to receive the powder falling in the fall passage, wherein a cross-sectional area of a space that is not occupied by the first conveyor in the first conveyance passage is larger than a cross-sectional area of a space that is not occupied by the second conveyor in the second conveyance passage when viewed in a cross section orthogonal to a conveyance direction in which the powder is conveyed, and wherein a relationship of $M1 \times 0.75 \leq N1 \leq M1 \times 0.9$ is satisfied when an inner diameter of the first conveyance passage is defined as M1 and an outer diameter of the first conveyor is defined as N1.

* * * * *